US012790026B2

(12) United States Patent
Moore et al.

(10) Patent No.: US 12,790,026 B2
(45) Date of Patent: Nov. 10, 2026

(54) AUTOMATED CLAMP

(71) Applicants: AIRBUS OPERATIONS LIMITED, Bristol (GB); THE MANUFACTURING TECHNOLOGY CENTRE LIMITED, Coventry (GB)

(72) Inventors: Ian Moore, Bristol (GB); David Cantle, Coventry (GB); Matthew Foster, Coventry (GB); Dan Edwards, Deeside (GB)

(73) Assignees: AIRBUS OPERATIONS LIMITED, Bristol (GB); THE MANUFACTURING TECHNOLOGY CENTRE LIMITED, Coventry (GB)

( * ) Notice: Subject to any disclaimer, the term of this patent is extended or adjusted under 35 U.S.C. 154(b) by 310 days.

(21) Appl. No.: 18/582,226

(22) Filed: Feb. 20, 2024

(65) Prior Publication Data

US 2024/0286761 A1 Aug. 29, 2024

(30) Foreign Application Priority Data

Feb. 24, 2023 (GB) ..................................... 2302659

(51) Int. Cl.
*B25J 15/04* (2006.01)
*B64F 5/10* (2017.01)

(52) U.S. Cl.
CPC ............. *B64F 5/10* (2017.01); *B25J 15/0408* (2013.01)

(58) Field of Classification Search
CPC ...... B64F 5/10; B25J 15/0408; B25J 15/0028; B25J 15/026
See application file for complete search history.

(56) References Cited

U.S. PATENT DOCUMENTS 4,132,318 A 1/1979 Wang et al.
4,955,119 A 9/1990 Bonomi
(Continued)

FOREIGN PATENT DOCUMENTS

DE 20 2019 000 040 U1 3/2019
EP 2221151 A2 8/2010
(Continued)

OTHER PUBLICATIONS

Combined Search and Examination Report for Application No. GB 2302659.4 dated Sep. 25, 2023, 6 pages.
(Continued)

*Primary Examiner* — Sunil K Singh
*Assistant Examiner* — Amanda Kreiling
(74) *Attorney, Agent, or Firm* — Nixon & Vanderhye, PC

(57) ABSTRACT

An automated clamp for clamping a rib web to a rib post or rib foot of an aircraft wing box is disclosed including a clamp frame having a first arm and a second arm extending from the base of the clamp frame. The second arm is moveable towards and away from the first arm; a robot end effector connector coupled to the clamp frame; clamp jaws including a first jaw fixed at a distal end of the first arm, and a second jaw fixed at a distal end of the second arm, the clamp jaws configured to clamp a rib web to a rib post or clamp a rib web to a rib foot. The first jaw and/or second jaw includes a contact normalisation system, the contact normalisation system including: a jaw body fixed relative to the respective arm.

19 Claims, 10 Drawing Sheets

(56) References Cited

U.S. PATENT DOCUMENTS

| | | | |
|---|---|---|---|
| 6,412,845 B1 | 7/2002 | Sawdon | |
| 8,695,190 B2 | 4/2014 | Sarh | |
| 9,610,693 B2 | 4/2017 | Sarh | |
| 10,118,714 B2 | 11/2018 | Reid | |
| 10,537,993 B2 | 1/2020 | Ulliman et al. | |
| 2018/0111701 A1 | 4/2018 | Cai | |
| 2018/0283842 A1 * | 10/2018 | Rueb | G01B 7/012 |
| 2021/0339888 A1 | 11/2021 | Jackson | |

FOREIGN PATENT DOCUMENTS

| | | | | |
|---|---|---|---|---|
| EP | 2995402 A1 | | 3/2016 | |
| EP | 3106270 A2 | * | 12/2016 | B25J 15/12 |
| EP | 3 106 270 A3 | | 11/2017 | |
| GB | 2590653 A | * | 7/2021 | B25B 5/064 |

OTHER PUBLICATIONS

Extended European Search Report for Application No. EP 24158960.5, nine pages, dated Jul. 31, 2024.

* cited by examiner

AUTOMATED CLAMP

CROSS RELATED APPLICATION

This application claims priority to United Kingdom Patent Application GB 2302659.4, filed Feb. 24, 2023, the entire contents of which is hereby incorporated by reference.

FIELD OF THE INVENTION

The present invention relates to an automated clamp, and a method of automatically clamping components of an aircraft assembly together using the automated clamp.

BACKGROUND OF THE INVENTION

In a traditional aircraft wing box, each rib is bolted to the upper and lower covers and to the front and rear spars. Assembly of such a wing box can be time-consuming and complicated due to the need to manufacture, drill, shim, and then bolt many components together.

Improved efficiency of aircraft assembly is a continual target, with 'one way assembly' shown to be a particularly effective approach. One-way assembly involves the drilling and fastening of an assembly without an intermediate step of disassembly after drilling and prior to fastening. If a clamping force is not applied then one way assembly is typically not practical, as inter-laminar burring may occur during drilling and necessitate the disassembly and cleaning before reassembly and final fastening.

To enable one way assembly of the aircraft wing, the respective aircraft components (e.g. ribs, spars, and rib feet/posts therebetween) need to be drilled and fastened together without removing the clamping force pressing them together.

If any one component of the primary wing structure cannot be assembled by this one-way assembly process, then the benefit of reducing build time cannot be realised. Yet the scale and geometry of the aircraft wing prevents many challenges in realising one-way assembly.

SUMMARY OF THE INVENTION

A first aspect of the invention provides an automated clamp for clamping a rib web to a rib post or rib foot of an aircraft wing box, the clamp comprising: a clamp frame having a first arm and a second arm extending from the base of the clamp frame, wherein the second arm is moveable towards and away from the first arm; a robot end effector connector coupled to the clamp frame; clamp jaws including a first jaw fixed at a distal end of the first arm, and a second jaw fixed at a distal end of the second arm, the clamp jaws configured to clamp a rib web to a rib post or clamp a rib web to a rib foot; wherein the first jaw and/or second jaw comprises a contact normalization system, the contact normalization system comprising: a jaw body fixed relative to the respective arm, and a nose-piece rotatably coupled to the jaw body and configured to contact a surface of one of the rib web, rib post and rib foot, wherein the nose-piece is configured to passively rotate relative to the jaw body upon contact with the surface.

With this arrangement, the clamp jaws are able to clamp flush against the aircraft assembly, ensuring that the contact surface of the jaw(s) is parallel to the surface to be clamped. This correction of any misalignment may subsequently be used to determine a rotation of the clamp to bring the whole automated clamp into alignment, not just the nose-piece.

The jaw body and nose-piece may be rotatably coupled at a bearing surface.

The bearing surface may be formed between a spherical end surface of the jaw body and a spherical end surface of the nose-piece.

The clamp jaws may comprise two or more flexible elements configured to bias the nose-piece towards the jaw body.

The contact normalization system may comprise a processing unit and one or more contact sensors configured to send a signal to the processing unit indicative of an angular rotation of the nose-piece relative to the jaw body.

With this arrangement, the automated clamp is provided with a means of determining the misalignment between the nose-piece and jaw body so that autocorrection can be undertaken.

The contact sensors may be fixed to the jaw body, and the contact sensors may be arranged to contact the nose-piece and send a signal to the processing unit indicative of an angular rotation of the nose-piece relative to the jaw body.

The one or more contact sensors may each be housed within the jaw body.

The contact normalization system may comprise two or more of the contact sensors fixed to the jaw body. The contact normalization system may comprise three or more contact sensors.

The automated clamp may comprise a vision system, the vision system having one or more imaging devices for detecting a datum of the rib web, rib post, or rib foot.

The vision system may include a first imaging device fixed to the first arm and having a line of sight oriented at an acute angle to a longitudinal axis of the clamp jaws and/or the vision system may have a second imaging device fixed to the second arm and having a line of sight oriented at an acute angle to a longitudinal axis of the clamp jaws.

The first and/or second jaw may have a tool module docking aperture for receiving a tool module, the tool module docking aperture arranged to provide access to the rib web and rib post or rib foot clamped between the clamp jaws.

A second aspect of the invention provides a method of automatically clamping components of an aircraft assembly together using the automated clamp of any preceding claim, the method comprising: positioning the nose-piece into contact with a surface of the aircraft assembly such that the nose-piece rotates until a longitudinal axis of the nose-piece aligns with a normal vector of the surface; and rotating the jaw body relative to the nose-piece to align a longitudinal axis of the jaw body to the longitudinal axis of the nose-piece and the normal vector of the surface.

The method may comprise: sending a signal to the processing unit indicative of an angular rotation of the nose-piece relative to the jaw body to determine an angle of rotation; and rotating the jaw body relative to the nose-piece in accordance with the determined angle of rotation.

The method may comprise: moving the first jaw a predetermined distance away from the aircraft assembly; calibrating the vision system relative to the aircraft assembly based on the predetermined distance; and identifying a datum on the aircraft assembly with the vision system.

The method may comprise: moving the second arm towards the first arm to clamp the aircraft assembly between the clamp jaws.

The method may comprise: inserting a drilling tool module into the tool module docking aperture and drilling a hole through the clamped aircraft assembly; removing the drilling tool module from the tool module docking aperture; inserting a fastening tool module into the tool module docking aperture to fasten the aircraft assembly; and moving the second arm away from the first arm to unclamp the aircraft assembly.

The aircraft assembly may comprise a rib web and a rib post of an aircraft wing box and/or a rib web and a rib foot of an aircraft wing box.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
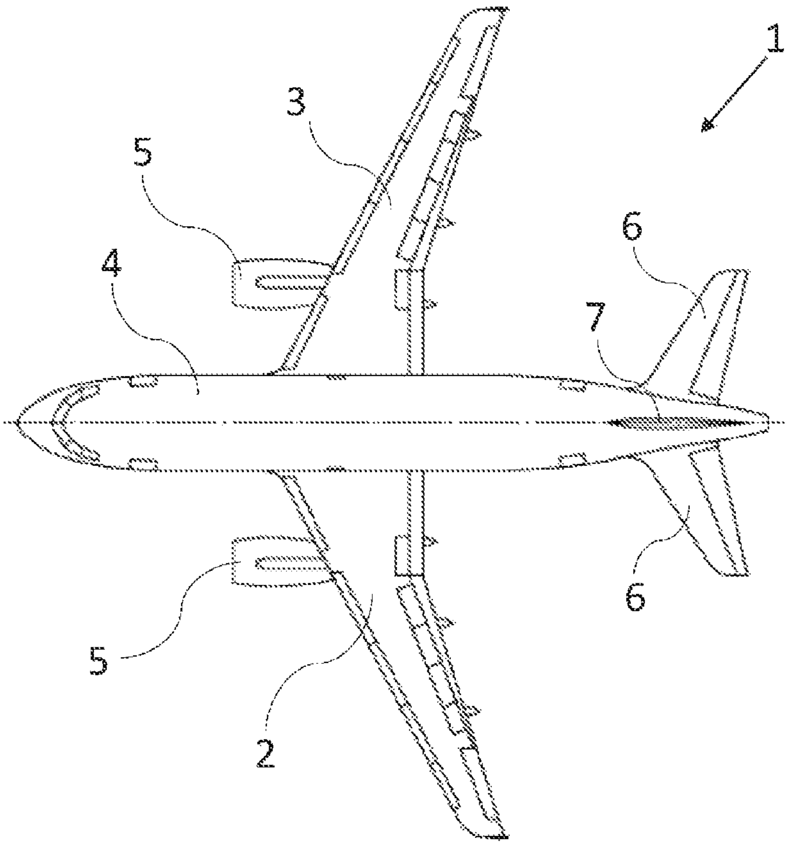
FIG. 1 shows a perspective view of a fixed wing aircraft.

FIG. 1 illustrates a typical configuration for a fixed wing passenger transport aircraft 1. The aircraft 1 comprises port and starboard wings 2, 3 extending from a fuselage 4, engines 5, horizontal tailplane 6 and vertical tailplane 7. It will be appreciated that this invention is applicable to a wide variety of aircraft types not just that illustrated in FIG. 1. For example, the aircraft may be for commercial or military purposes, may be for transporting passengers or cargo, may have jet, propeller or other engine propulsion systems, may have a variety of fuselage/wing configurations, e.g. a high wing, low wing, or blended wing body, and may be designed to fly at subsonic, transonic or supersonic speeds. Although the present invention is described by reference to a wing, it will be understood that the present invention may be applicable to other aerofoil shaped bodies, such a tail planes.

Each wing 2, 3 is formed as an aerofoil shaped body. Each wing has a cantilevered structure with a length extending in a spanwise direction from a root to a tip, the root being joined to an aircraft fuselage 4. Similarly, the horizontal and vertical tail planes 6, 7 are similarly arranged. Each wing 2, 3 includes a torsion box, otherwise known as a wing box. The wings 2, 3 are similar in construction so only the starboard wing 2 will be described in detail with reference to FIGS. 2 and 3.

Figure 2:
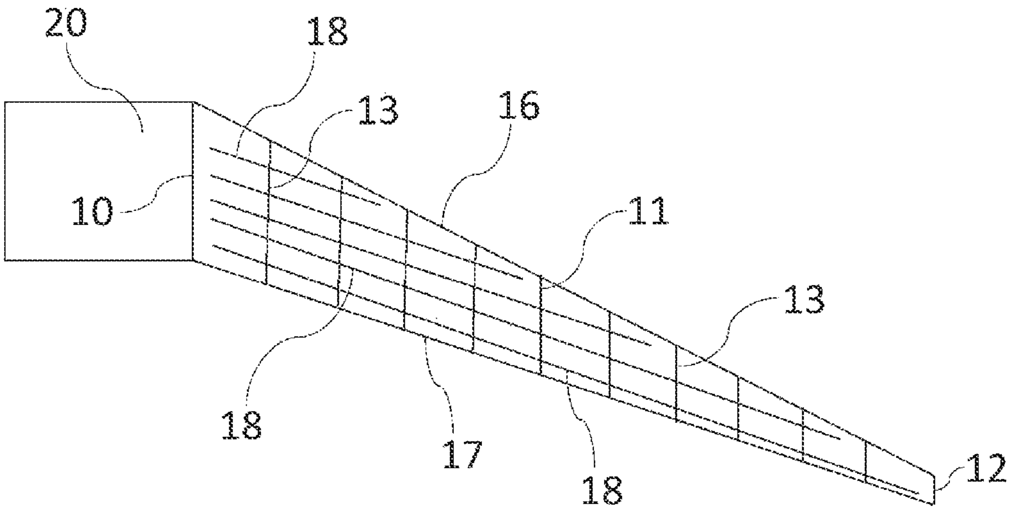
FIG. 2 shows a schematic plan view of a starboard wing box and centre wing box.

The main structural element of the wing is a wing box formed by upper and lower covers 14, 15 and front and rear spars 16, 17. The covers 14, 15 and spars 16, 17 are each Carbon Fibre Reinforced Polymer (CFRP) laminate components. Each cover has an aerodynamic surface (the upper surface of the upper cover 14 and the lower surface of the lower cover 15) over which air flows during flight of the aircraft. Each cover also has an inner surface carrying a series of stringers 18 extending in the spanwise direction. Each cover carries a large number of stringers 18, only five of which are shown in FIG. 2 for purposes of clarity. Each stringer 18 is joined to one cover but not the other.

The wing box also has a plurality of transverse ribs, each rib being joined to the covers 14, 15 and the spars 16, 17. The ribs include an inner-most inboard rib 10 located at the root of the wing box, and a number of further ribs spaced apart from the inner-most rib along the length of the wing box. The wing box is divided into two fuel tanks: an inboard fuel tank bounded by the inboard rib 10, a mid-span rib 11, the covers 14, 15 and the spars 16, 17; and an outboard fuel tank bounded by the mid-span rib 11, an outboard rib 12 at the tip of the wing box, the covers 14, 15 and the spars 16, 17.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2, the stringers 18 stop short of the inboard rib 10 and the outboard rib 12 but pass through the baffle ribs 13 and the mid-span rib 11.

Figure 3:
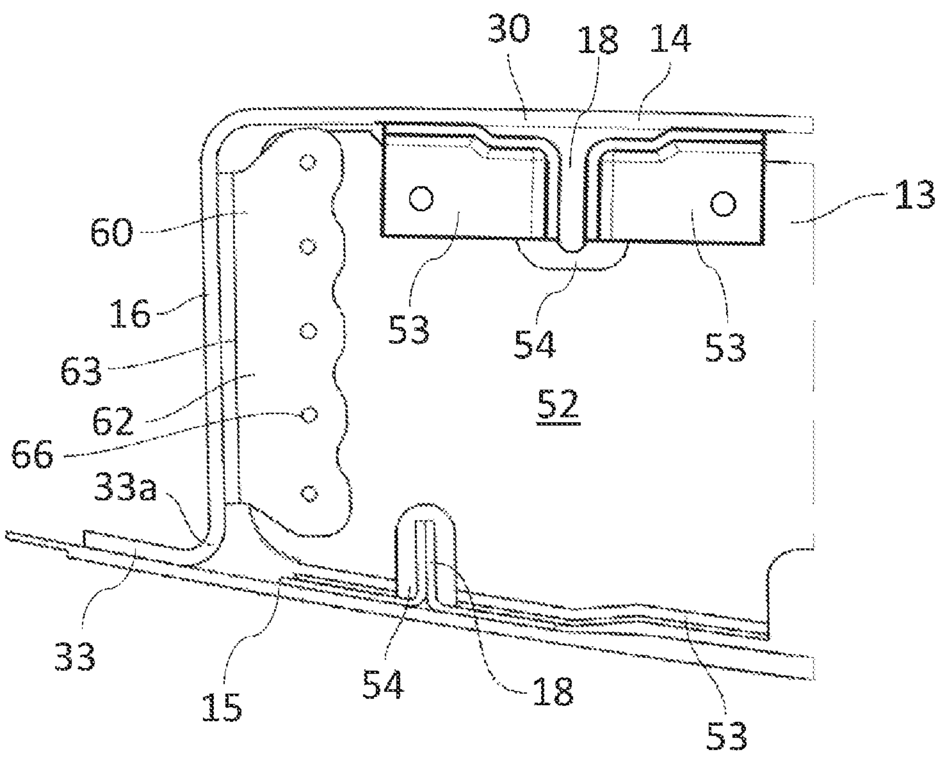
FIG. 3 shows a partial cross sectional side view of a forward end of the wingbox, showing the rib web, rib post and integrated rib feet.

FIG. 3 shows a cross sectional partial side view of a forward end region of the wing 2 of the aircraft 1. In the illustrated example, the wing 2 comprises a spar-cover 30 comprising the upper cover 14 and the front spar 16. The spar-cover 30 includes a lower spar flange 33 extending from the front spar 16 via a curved profile 33*a* and integrally formed with the front spar 16. The spar-cover 30 is an integrally formed, monolithic component comprising the upper cover 14, the front spar 16, and the lower spar flange 33. However, it will be appreciated that in other examples the spar, cover, and flanges may be separate. The lower spar flange 33 acts as an attachment flange for mounting with the lower cover 15. The spar-cover 30 comprises fibre reinforced matrix composite laminate material, such as carbon fibre reinforced polymer. As can be seen from FIG. 3, the spar-cover 30 is substantially Z-shaped. Although it will be appreciated that other arrangements may be adopted. The rear spar 17 (not shown in FIG. 3) may be substantially C-shaped with upper and lower attachment flanges for joining to the upper and lower covers 14, 15, respectively. In another arrangement, the spar-cover may be substantially Omega-shaped so as to comprise the one of the covers, and both the front and rear spars, with front and rear attachments flanges for joining to the other of the covers.

The rib 13 extends in a chordwise direction of the wing box. The rib 13 extends between the front spar 16 and the rear spar 17, and between the upper cover 14 and lower cover 15. The rib 13 is joined to the front spar 16 by a rib post 60. The rib post 60 at the forward end attaches the rib 13 to the front spar 16. A corresponding rib post 60 at the rearward end of the rib 13 attaches the rib to the rear spar 17. One or more of the rib posts 60 may be integrally formed with the rib 13. The rib 13 comprises fibre reinforced matrix composite laminate material, such as carbon fibre reinforced polymer (CFRP). Although components are described herein as being formed from fibre reinforced matrix composite laminate material, such as carbon fibre reinforced polymer, it will be understood that alternative materials may be used.

The rib 13 includes a rib web 52. The rib web 52 defines the general plane of the rib 13. Rib feet 53 mount the rib 13 to the upper and lower covers 14, 15. The rib feet 53 adjacent the lower cover 15 are shown in FIG. 3 as integrally formed with the rib web 52. However, the rib feet 53 adjacent the upper cover 14 are shown in FIG. 3 as integrated with the upper cover 14 and the upper cover stringers 18, and are attached to the rib web 52, e.g. by bolting. The rib feet 53, stringers 18 and other components may be attached or co-cured to the upper and lower covers 14, 15 in various configurations.

The stringers 18 are of conventional type and so will not be described in further detail. The stringers 18 reinforce the covers, acting as spanwise extending reinforcing members, which are attached or integrally formed with the inside of the covers 14, 15. The stringers 18 extend through mouseholes 54 in the rib 13.

This invention particularly concerns the automated joining of the rib web 52 to the rib post(s) 60 and the rib feet 53 during construction of the wing box.

The rib post 60 includes a rib post web 62 and a rib post foot 63. The rib post web 62 upstands from the rib post foot 63. The rib post foot 63 extends either side of the rib post web 62. The rib post 60 is substantially T-shaped, however it will be understood that alternative shapes are possible, for example L-shaped. The rib post web 62 extends transversely from the rib post foot 63. The rib post web 62 is fixedly mounted to the rib web 52. Fasteners 66 fix the rib post web 62 with the rib web 52. The fasteners 66 are conventional and may include rivets and/or bolts. The rib post web 62 overlaps the rib web 52 and is fixed in an overlapping arrangement.

Figure 4:
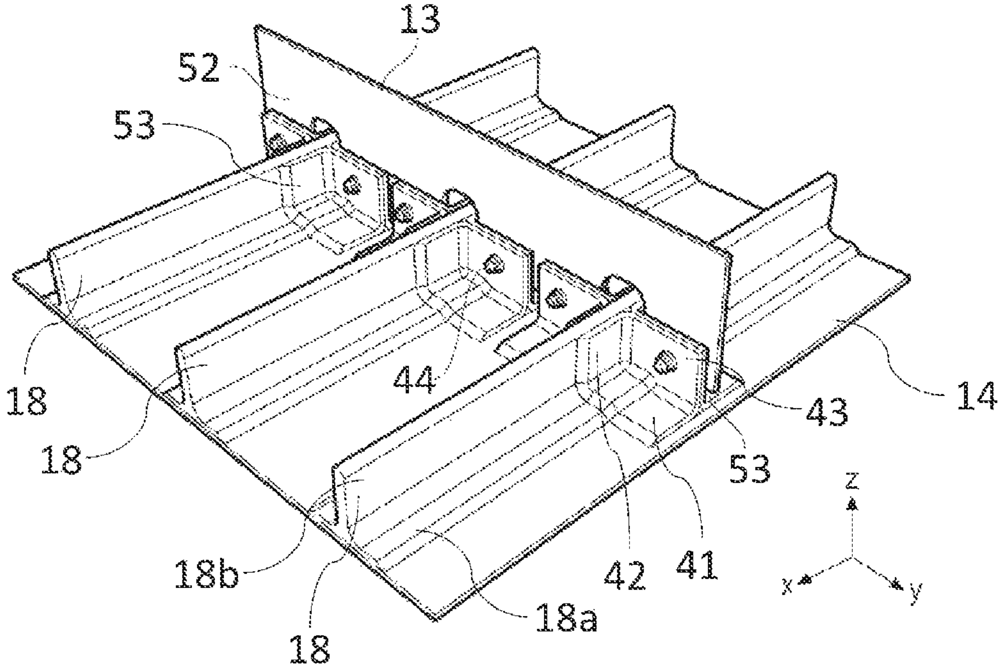
FIG. 4 shows a partial perspective view of a wing cover with integral stringers, integrated rib feet and the rib web.

FIG. 4 shows part of the upper cover 14 including three stringers 18. The rib 13 comprises a planar rib web 52 connected to the upper cover by a plurality of CFRP laminate rib feet 53—six of such rib feet being shown in FIG. 4. Each rib foot 53 is formed by two mirror-symmetrical parts positioned back-to-back. Each part has a generally horizontal first flange 41; an upstanding second flange 42; and an upstanding web 43 positioned back-to-back with the web of the other part (these webs 43 being joined together back-to-back by a co-cured joint).

The first flange 41 of the rib foot may be co-cured to the stringer flange 18*a* and inner surface of the cover 14. This co-cured joint (without bolts) between the rib foot flange 41 and the cover 14 means that no drilled bolt holes need to be provided in the cover. The second flange 42 may be co-cured to the stringer web 18*b*, and the web 43 of the rib foot joined to the rib web 52 by fasteners 44. The fasteners 44 are conventional and may include rivets and/or bolts. The rib foot web 43 overlaps the rib web 52 and is fixed in an overlapping arrangement.

Joining the rib web 52 to the rib foot web 43 and/or to the rib post web 62 will now be described.

Figure 5:
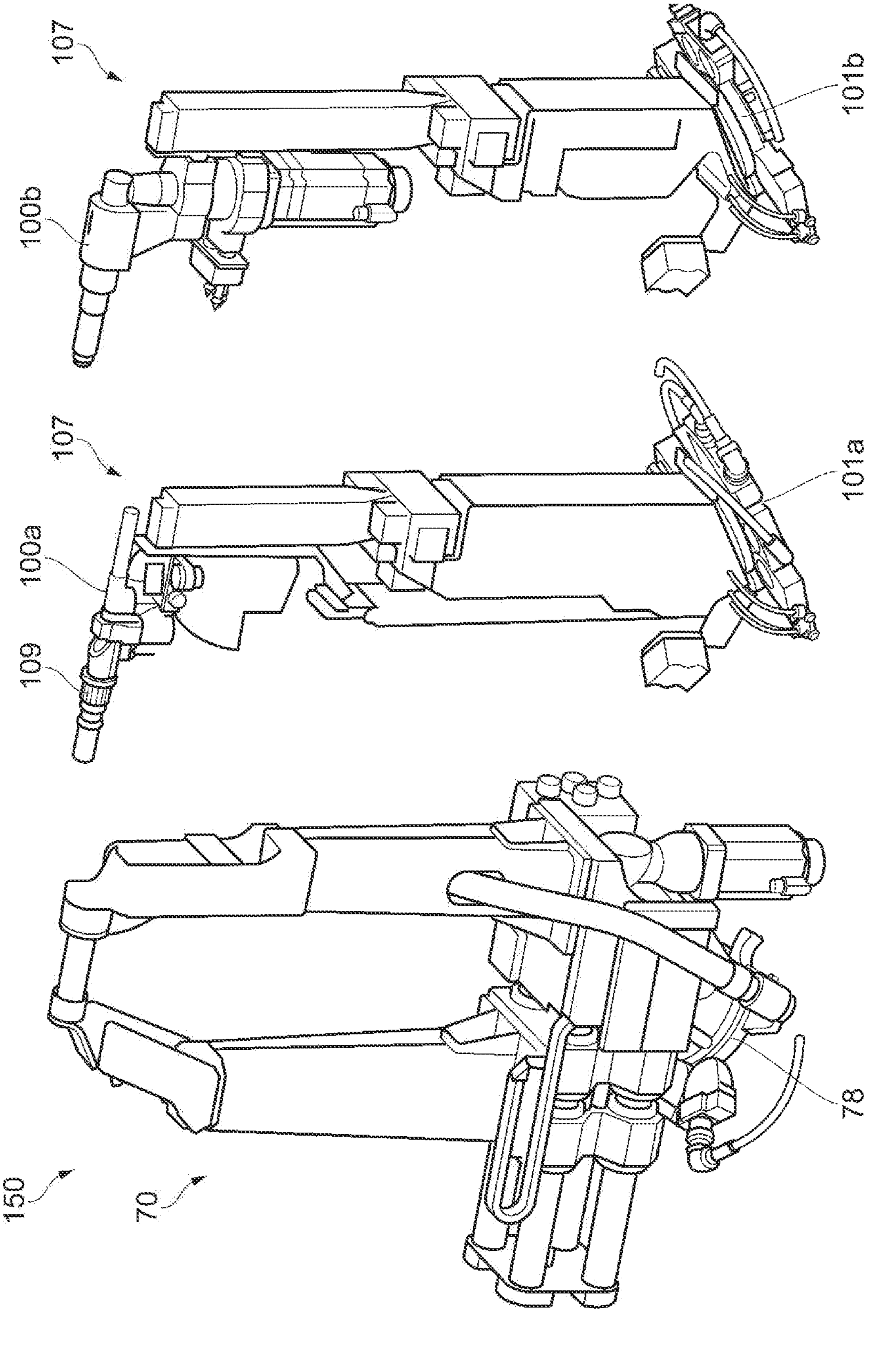
FIG. 5 shows an automated clamp system.
Figure 6:
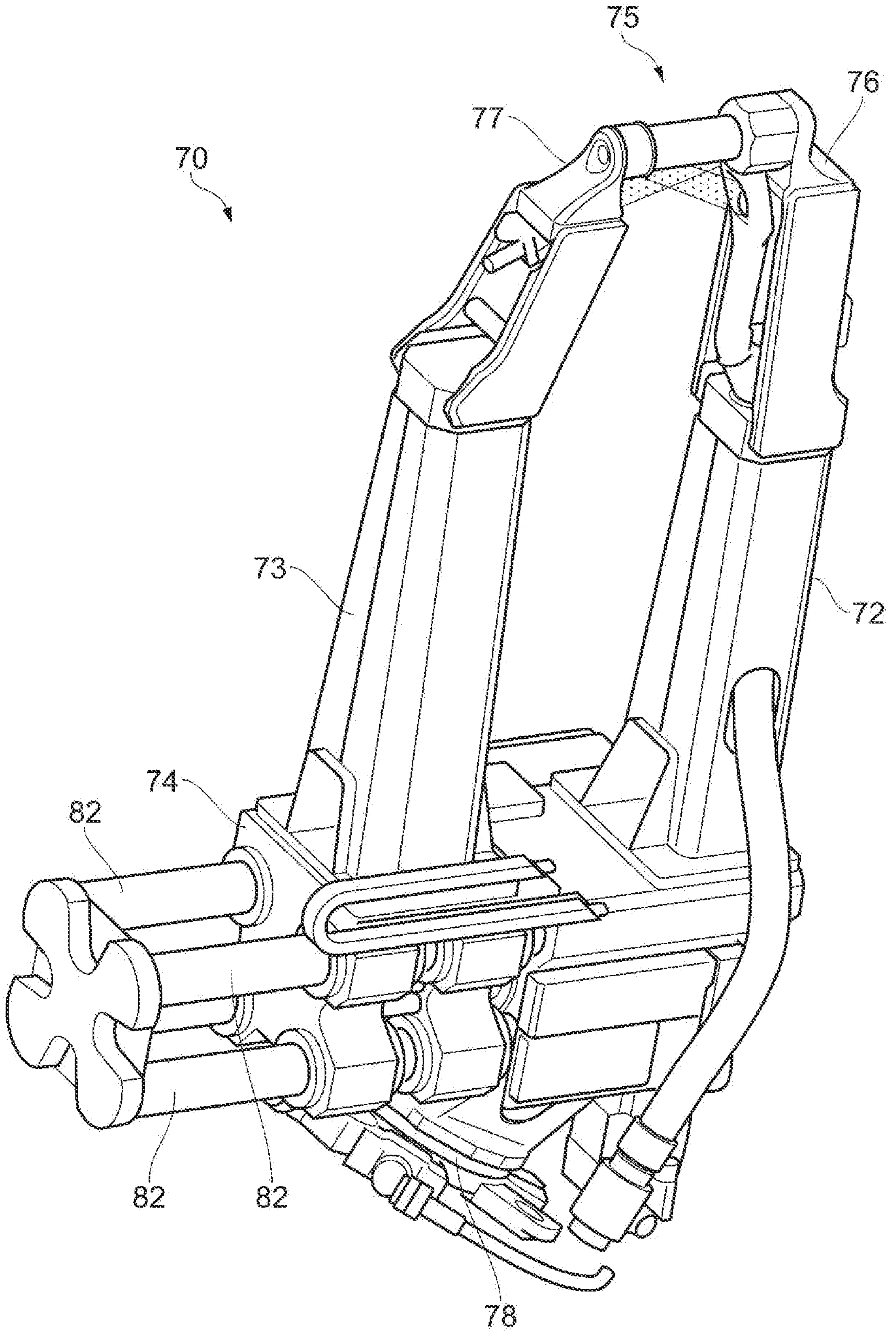
FIG. 6 shows a perspective view of an automated clamp of the clamp system.

FIG. 5 shows part of a clamp system 150 including an automated clamp 70 shown in further detail in FIG. 6. The clamp 70 has a clamp frame 71. The clamp frame 71 includes a first arm 72 and a second arm 73 that extend from a base 74 of the clamp frame 71. The first and second arms 72, 73 extend in generally parallel and in the same direction such that the clamp 70 is generally 'U' shape. The second arm 73 is moveably mounted to the base 74 of the clamp frame 71 so as to be moveable towards and away from the first arm 72. The first arm 72 is fixed relative to the base 74.

The clamp 70 has clamp jaws 75 for clamping either side of an aircraft assembly 50, for example clamping the rib web 52 to the rib post 60, or the rib web 52 to the rib foot 53. The clamp jaws 75 include first and second jaws 76, 77. The first jaw 76 is fixed at a distal end of the first arm 72, relative to the proximal end of the first arm 72 at the base 74. The second jaw 77 is fixed at a distal end of the second arm 73, relative to the proximal end of the second arm 73 at the base 74. The distance between the arms 72, 73 may be sufficient to clear around rib feet 53 of the rib 13 during positioning of the clamp 70, with a margin for robot position tolerance and fixture position tolerance.

Figure 7:
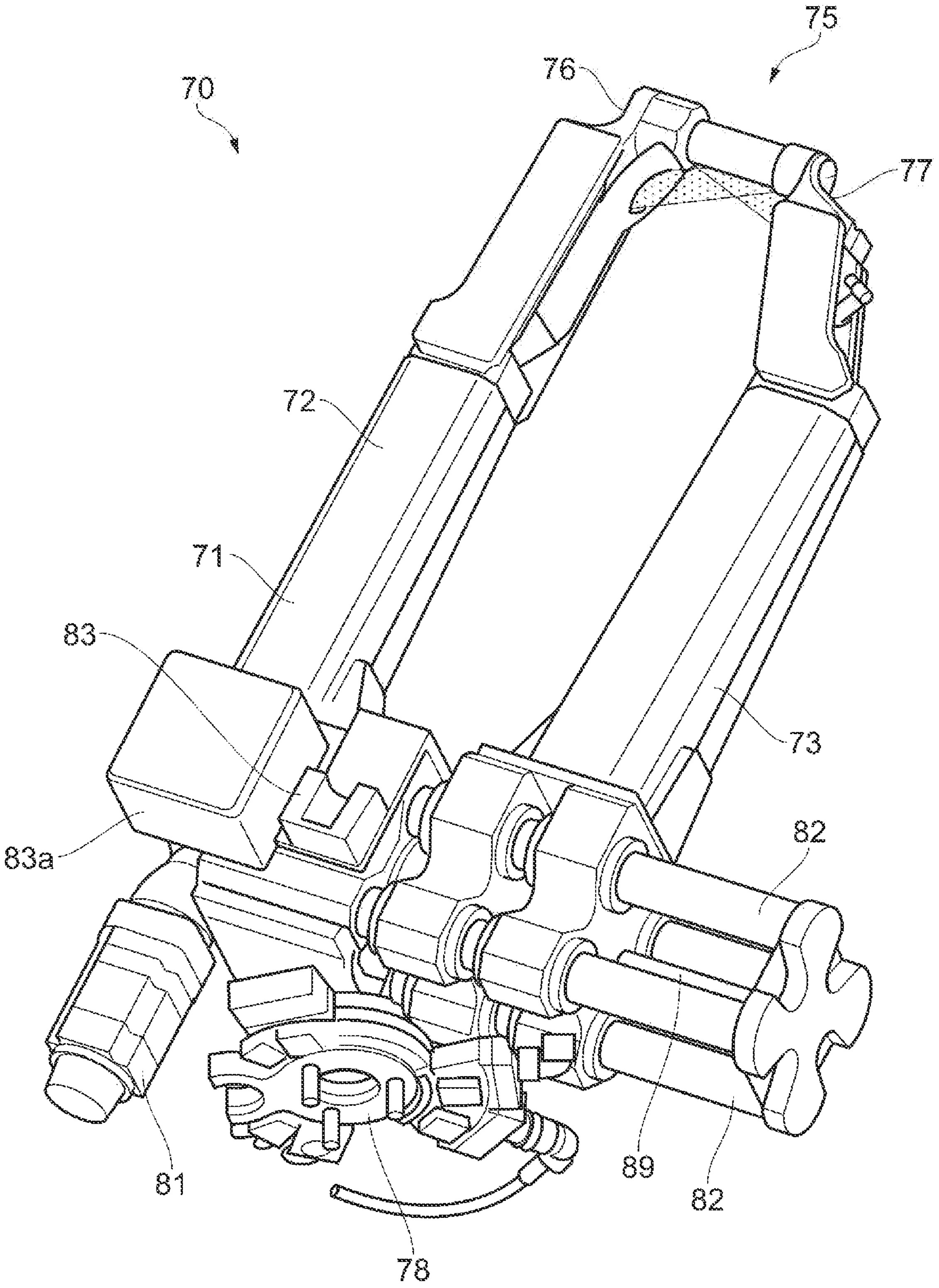
FIG. 7 shows an alternative perspective view of the automated clamp.

The second arm 73 is mounted on a set of linear guides 82 (e.g. linear rail) for linear movement of the second arm 73 with respect to the clamp frame 71 to open and close the clamp jaws 75. The set of linear guides 82 may include one or more linear guides 82, with the example shown in FIG. 6 having four linear guides 82. The clamp 70 includes a motor 81 (and accompanying gearbox) that has a rotational axis oriented perpendicular to the linear guides 82 and drives the second arm 73, e.g. along a ball-screw mechanism 89 as shown in FIG. 7, towards and away from the first arm 72.

A robot end effector connector 78 is coupled to the clamp frame 71, for example to the base 74 of the clamp frame 71. The end effector connector provides physical and electrical coupling of the clamp 70 to a robot as part of a clamp system 150. The robot end effector connector 78 provides detachable connection to the robot. Alternatively, the robot end effector connector 78 may provide a permanent connection between the clamp 70 and the robot.

Figure 10:
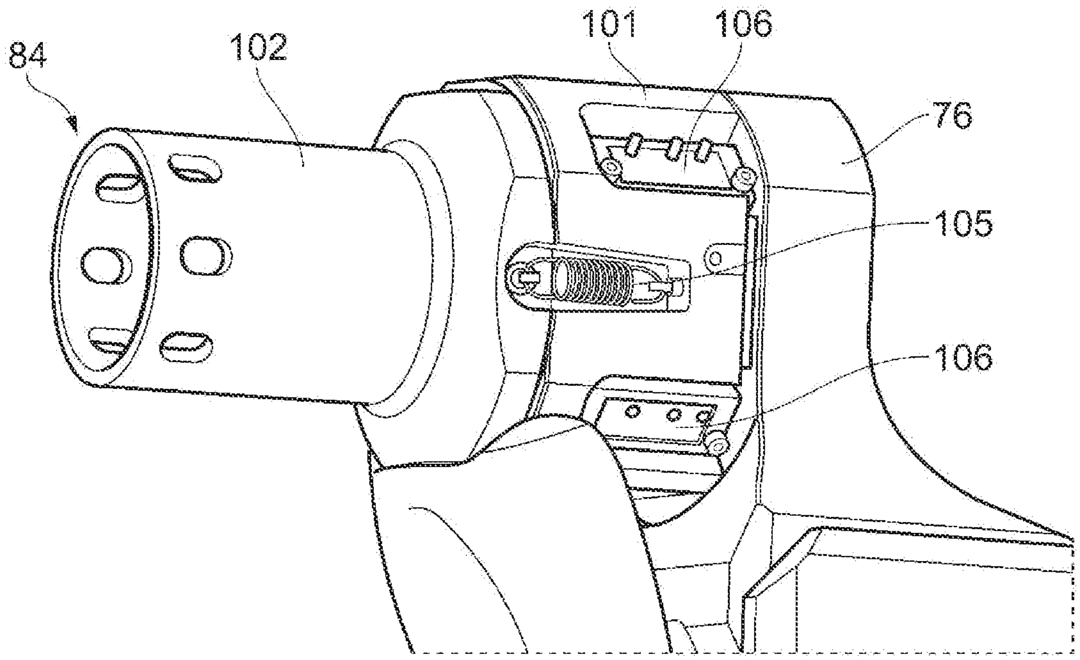
FIG. 10 shows the first jaw attached to the first arm.

The first clamp jaw 76 includes a tool module docking aperture 84 configured to receive a tool module and through which a drilling tool or a fastening tool are individually insertable, see FIG. 10. The aperture 84 is a through-hole configured to receive an expanding collet 109 of the tool module and may include a collet bore 85 arranged to releasably fix the tool module in position in the aperture 84 relative to the clamp frame 71 (See FIG. 18). The tool module may be a drilling module 100*a* having a drilling tool, or a fastening module 100*b* having a fastening tool (See FIG. 5). The drilling tool may carry a drill bit. The drilling tool may be received by the aperture 84 in the first clamp jaw 76, e.g. the drilling tool may be captured in the collet bore 85. The fastening tool may be received by the aperture 84 in the first clamp jaw 76, e.g. the fastening tool may be captured in the same collet bore 85 as the drilling tool in a sequential operation.

The aperture 84 allows access of the drilling tool and fastening tool to the aircraft assembly 50, such that the tool is extendable through the aperture 84 towards the aircraft assembly 50.

Each of the tool modules 100*a*, 100*b* is connected to an end effector 107 that has a respective robot end effector connectors 101*a*, 101*b* providing physical and electrical connection between the tool module 100*a*, 100*b* and a second robot. The tool module 100*a*, 100*b* is mainly supported by the second robot and not by the aperture 84 in the clamp 70.

The clamp 70 has a size and geometry suitable for extending either side of the rib web 52, such that the arms 72, 73 are at least as long as the rib web 52 being assembled, whilst providing a construction stiff enough to deliver sufficient clamping force on the aircraft assembly 50. The clamp 70 is therefore relatively large yet is expected to operate in a space that is relatively restricted and difficult to access. Consequently, there is a need to tightly package the clamp 70 so as to minimise its size, particularly at the clamp jaws 75.

To reduce the size of the clamp 70 towards the jaw 75 end of the clamp 70, the jaws 76, 77 are moveable from the base 74 of the clamp frame 71 such that the whole of each arm 72, 73 move relative to the other rather than only the jaws 76, 77 moving relative to one another. This creates challenges in ensuring the arms 72, 73 do not clash with components positioned between the arms 72, 73 (i.e. components between the arms 72, 73 and below the jaws 76, 77), however avoiding the positioning of motors, gearing and other means at the clamp jaws 75 is considered to offset these drawbacks.

Further to this, the design constraints on the linear guides 82 are reduced. Consequently, the gearbox and motor 81 can be larger so as to provide greater torque or accuracy. The linear guides 82 can be larger, and thereby more rigid, whilst multiple linear guides 82 can also be fitted onto the clamp 70. These features can all improve the stability of the second arm 73 relative to the first arm 72.

The loads resulting from the clamp jaws 75 impacting the aircraft assembly 50 can also be resolved by a loads monitoring device 83 positioned at the base 74 of the clamp frame 71 rather than requiring any loading monitoring device to be placed on the arms 72, 73 or adjacent the clamp jaws 75. For example, FIG. 7 shows a load cell 83*a* located at an end of the ball-screw mechanism 89.

The reduced design constraints can allow the linear guides 82 to be longer compared to what otherwise might be possible, allowing additional relative movement between the jaws 76, 77.

The robot end effector connector 78 is positioned on the base 74 of the clamp 70, so that the robot can be positioned as far from the clamp jaws 75 as possible. In particular, FIG. 7 shows an example in which the robot end effector connector 78 is positioned on an opposite side of the base 74 to the arms 72, 73, such that the robot arm attachable to the robot end effector connector 78 extends away from the clamp 70.

The clamp 70 includes a vision system 93 for accurate final positioning of the clamp 70. The vision system 93 operates by detecting a datum feature of the component(s) to be clamped (e.g. a hole or edge of the component) and determining a datum from this datum feature.

Figure 8:
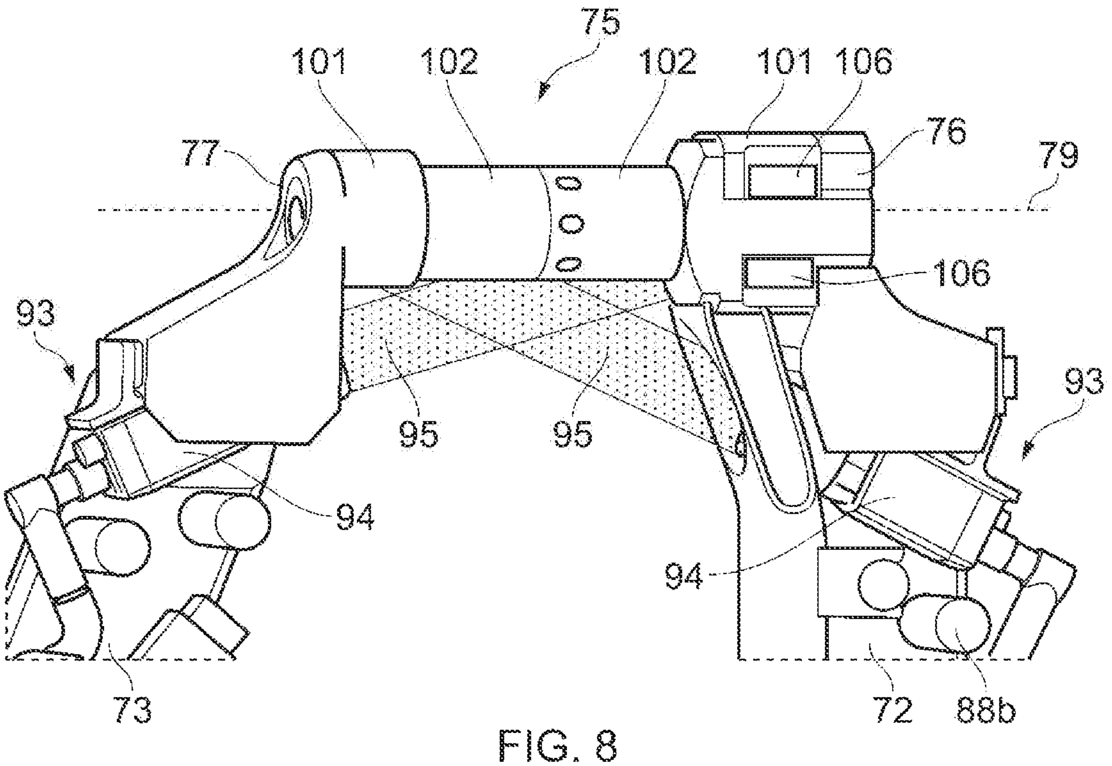
FIG. 8 shows a first view of the clamp jaws.

The datum acts as a reference point from which the clamp 70 is moveable such that accurate positioning of drilling and fastening operations is achieved. The vision system 93 may include one or more imaging devices 94 (e.g. cameras) that are fixed to a respective arm 72, 73. FIG. 8 shows a first imaging device 94 fixed to the first arm 72 and a second imaging device 94 fixed to a second arm 73. The imaging devices 94 have a line of sight 95 directed towards the other of the arms 72, 73, such that the first imaging device 94 has a line of sight 95 directed towards the second arm 73 and the second imaging device has a line of sight 95 directed towards the first arm 72. In this manner, the imaging devices 94 have a line of sight 95 that is directed towards the aircraft assembly 50 being clamped between the jaws 75.

Due to the space constraints of the clamp 70, each arm 72, 73 of the clamp 70 has only one imaging device 94, and each imaging device 94 is positioned below the clamp jaws 75. The imaging devices 94 field of view is concentrated generally towards the jaws 75, such that the line of sight 95 of the imaging device 94 is at an acute angle to the longitudinal axis 79 of the clamp jaws 75 (e.g. at an angle of around 30 degrees).

Due to the use of a single imaging device 94 on each side of the aircraft assembly 50, as well as the acute angle of the imaging device 94 relative to the longitudinal axis 79 of the jaws 75, the vision system 93 may be unable to determine the distance between the aircraft assembly 50 and the respective clamp jaw 76, 77, and is therefore unable to detect a suitable datum.

To account for this, the clamp 70 performs a calibration procedure using a contact normalization system of the jaw 76, 77 to calibrate the distance of each imaging device 94 from the surface of the aircraft assembly 50. This allows an accurate datum to be determined.

The contact normalization system includes a jaw body 101 fixed relative to the first arm 72, and a nose-piece 102 rotatably coupled to the jaw body 101. The nose- piece 102 and jaw body 101 contact at a bearing surface therebetween, with the bearing surface formed between a spherical end surface 103 of the jaw body 101 and a spherical end surface 104 of the nose-piece 102 (See FIGS. 12 to 17).

The contact at the bearing surface is low friction, such that the nose-piece 102 effectively floats relative to the jaw body 101, with one or more flexible elements 105 (e.g. springs) that extend between the jaw body 101 and the nose-piece 102 arranged to bias the nose-piece towards the jaw body 101 whilst still allowing relative rotation.

In this manner, the contact normalization system allows the nose- piece 102 to orient itself flush against the aircraft assembly 50 regardless of the relative orientation of the jaw body 101 fixedly attached to the first arm 72. The misalignment between the longitudinal axis of the jaw body 101 and the nose-piece 102 can then be used as a guide to orient the clamp frame 71.

Figure 11:
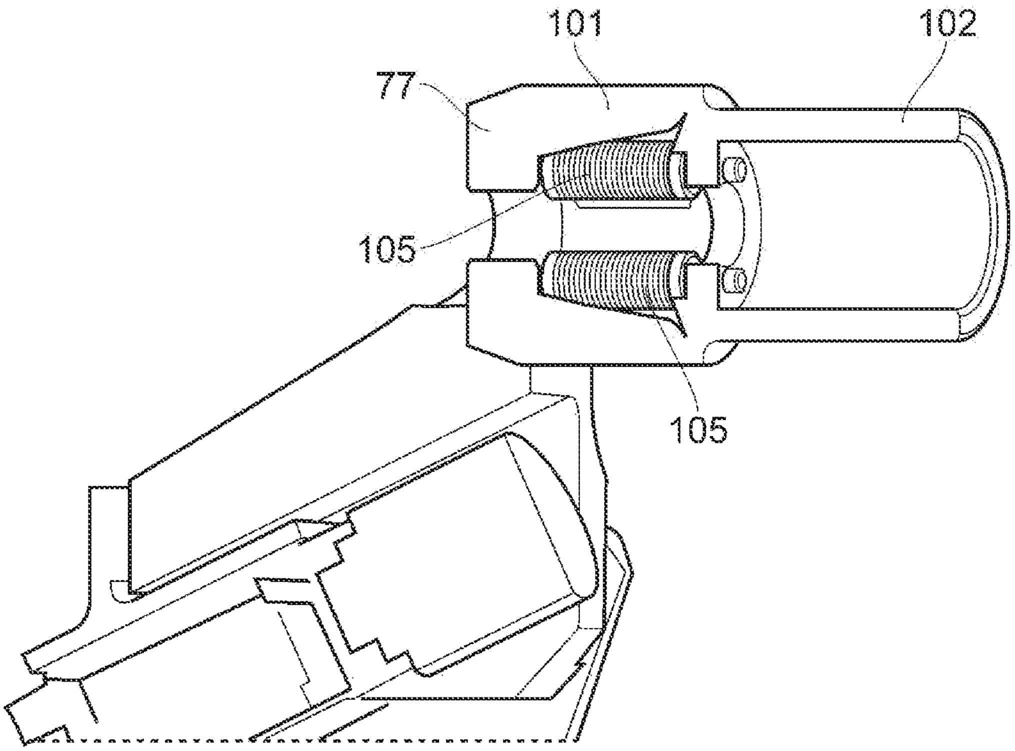
FIG. 11 shows the second jaw attached to the second arm.

It will be appreciated that the second arm 73 may similarly have a contact normalization system, such as described (e.g. see FIG. 11). In this example, the flexible elements 105 are housed within the jaw body 101 of the second jaw 77.

The contact normalization system may include one or more contact sensors 106 arranged to send a signal to a processing unit that is indicative of the angular rotation of the nose-piece 102 relative to the jaw body 101, i.e. the misalignment between the longitudinal axes of the nose-piece 102 and jaw body 101. In the example shown in FIG. 10, the contact normalization system comprises four contact sensors 106 arranged evenly about the longitudinal axis of the jaw body 101.

The relative size of the contact sensors 106 allows each of the contact sensors 106 to be housed within the jaw body 101, thereby minimising the space envelope at the clamp jaw 75 end of the clamp frame 71.

The calibration procedure will now be described with reference to FIGS. 12 to 17.

Figure 12:
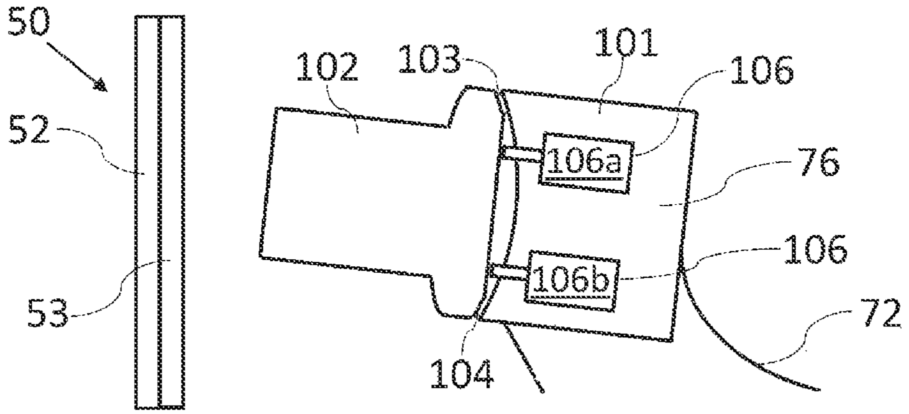
FIG. 12 shows a first stage of the calibration procedure in which the first jaw is brought towards the aircraft assembly.

The robot moves the automated clamp 70 towards an aircraft assembly 50 to be clamped. FIG. 12 shows part of a rib web 52 and a rib foot 53, although it will be appreciated that other components may be clamped, such as the rib web 52 to the rib post 60. The clamp frame 71 is moved so as to straddle the rib web 52 such that each arm 72, 73 of the clamp frame 71 is on an opposing side of the aircraft assembly 50.

The nose-piece 102 of the first jaw 76 is brought towards the aircraft assembly 50 so as to come into contact with the surface of the aircraft assembly 50. Typically, the longitudinal axis of the nose-piece 102 will be misaligned with the normal vector of the surface, such that the nose-piece 102 rotates into alignment with the normal vector (See FIG. 13) and out of alignment with the longitudinal axis of the jaw body 101.

The contact sensors 106 fixed to the jaw body 101 contact the nose-piece 102 and send a signal to the processing unit indicative of the angular rotation. In particular, the contact sensors 106 remain in contact with a planar end surface 108 of the nose-piece 102. In the present example, the planar end surface 108 is surrounded circumferentially by the spherical end surface 104, although it will be appreciated that other arrangements may be provided.

Figure 13:
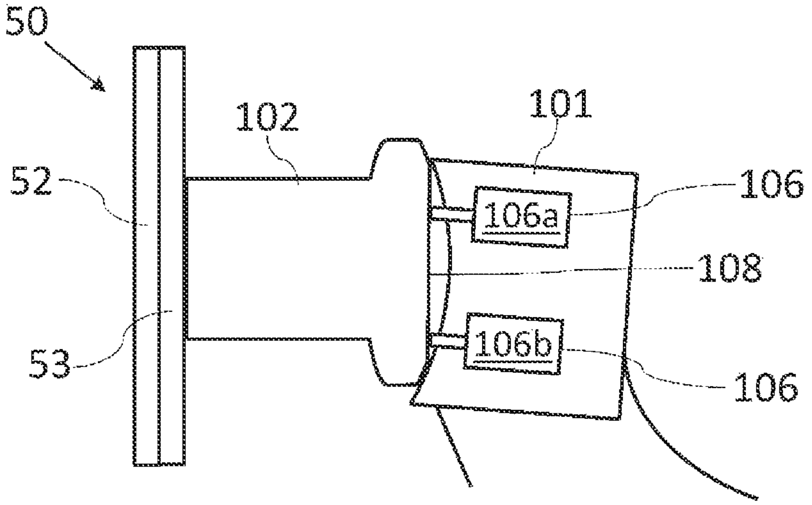
FIG. 13 shows a second stage of the calibration procedure in which the nose-piece of the first jaw contact the aircraft assembly.
Figure 14:
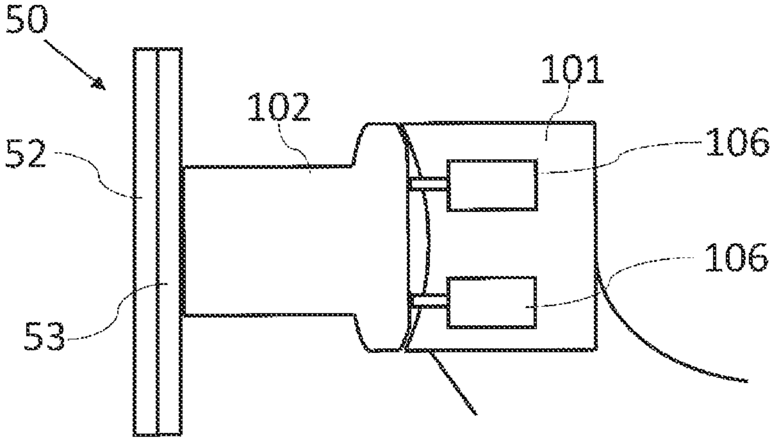
FIG. 14 shows a third stage of the calibration procedure in which the jaw body of the first jaw is rotated to align with the nose-piece.

The distance between the planar end surface 108 and each contact sensor 106 changes in proportion to the degree of angular rotation of the nose-piece 102. In comparing the contact normalisationnormalization system shown in FIGS. 12 and 13, the planar end surface 108 in FIG. 13 is shown to move closer to a body of the first contact sensor 106*a* whilst the planar surface 108 is shown to move further away from a body of the second contact sensor 106*b*.

It will be appreciated the contact sensors 106 may be able to detect the rotation of the nose-piece when in contact with other surfaces that are non-planar, e.g. a non-spherical surface.

The contact sensors 106 send a signal to a processing unit in accordance with the displacement of the nose-piece 102 measured by the contact sensors 106. The signals are indicative of the angular rotation of the nose-piece 102, with the use of at least two contact sensors 106 allowing the angular rotation of the nose-piece 102 to be determined about the two axes perpendicular to the longitudinal axis of the jaw body 101.

The jaw body 101 is then rotated relative to the nose-piece 102 via movement of the clamp frame 71 coupled to robot end effector connector 78. The rotation is such that the longitudinal axis of the jaw body 101 is aligned with the longitudinal axis of the nose-piece as well as the normal vector of the surface of the aircraft assembly 50. The rotation of the jaw body 101 relative to the nose-piece 102 equals the angle of rotation determined by the processing unit based on the signals from the contact sensors 106.

Figure 15:
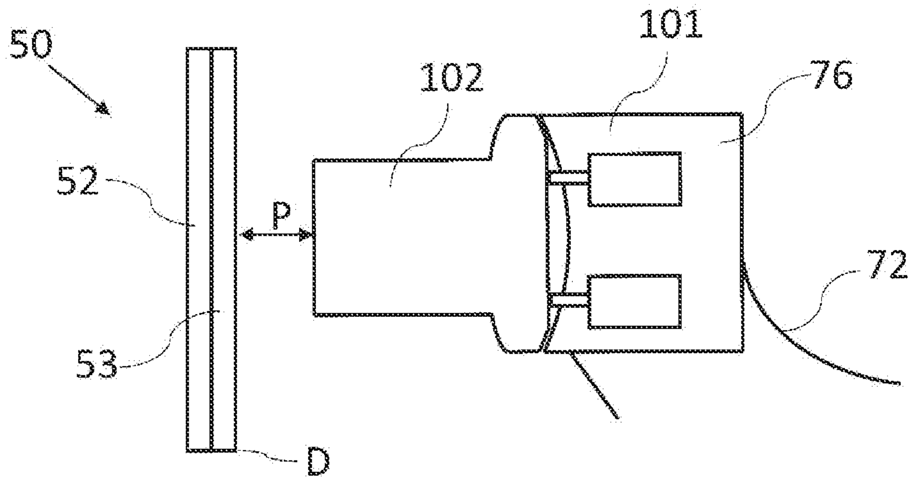
FIG. 15 shows a fourth stage of the calibration procedure in which the first jaw is moved back from the aircraft assembly by a predetermined distance.

At this point, the automated clamp system 150 identifies a datum D using the vision system 93 (for example the datum D may be an edge of the aircraft assembly 50 such as shown in FIG. 15). As previously discussed, the use of a single imaging device 94 having a line of sight 95 angled relative to the longitudinal axis 79 of the jaws 75 results in the vision system 93 being unable to determine the distance between each side of the aircraft assembly 50 and the respective clamp jaw 76, 77, and therefore unable to detect a suitable datum.

To resolve this issue, the clamp frame 71 (specifically the first jaw 76) is moved a predetermined distance P away from the aircraft assembly 50—FIG. 15. This allows the vision system 93 to calibrate itself relative to the aircraft assembly 50 so that a datum of the aircraft assembly 50 can be accurately identified.

Figure 16:
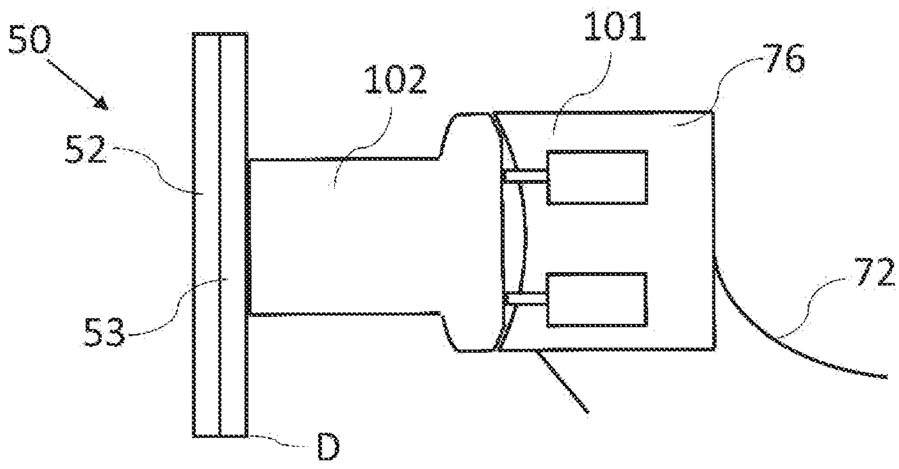
FIG. 16 shows a fifth stage of the calibration procedure in which the first jaw has been moved into contact with the aircraft assembly.

The clamp 70 is then moved into an assembly position that aligns the tool module docking aperture 84 with a location to be drilled/fastened (See FIG. 16). Upon alignment with the assembly position, the first jaw 76 is once again brought towards the aircraft assembly so that the nose-piece 102 contacts the surface of the aircraft assembly 50—FIG. 16. It is expected that the longitudinal axis of the jaw body 101 is aligned with the longitudinal axis of the nose-piece 102 and the normal vector of the surface, however the automated clamp system 150 may reconfigure the clamp frame 71 to ensure proper alignment.

Figure 17:
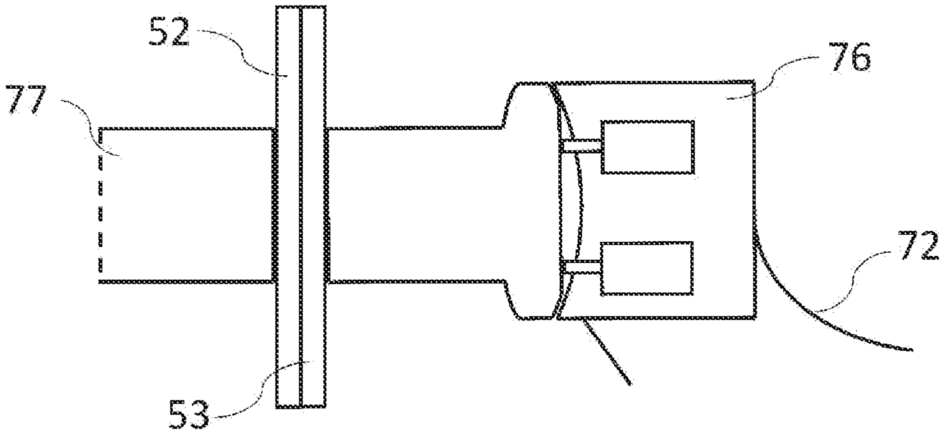
FIG. 17 shows a sixth stage of the calibration procedure in which the second jaw is moved so as to clamp the aircraft assembly between the clamp jaws.

The second arm 73 is then moved towards the first arm 72 so as to clamp the aircraft assembly 50 between the first and second jaws 76, 77 FIG. 17. The second jaw 77 may include a contact normalization system that has a nose-piece 102 that rotates relative to a jaw body 101 in order to ensure the end of the nose-piece 102 is flush against the aircraft assembly 50.

A drilling tool module 100*a* is then inserted into the tool module docking aperture 84 and a hole drilled into the aircraft assembly 50. The drilling tool module 100*a* is retracted from the tool module docking aperture 84 and a fastening tool module 100*b* inserted into the tool module docking aperture 84 in order to fix the components together with a fastener (not shown).

In order to realise the advantages of one-way assembly, it is important that the clamping force is maintained during throughout the entire process, with the clamping force applied before drilling commences and is not removed until the components have been fastened together. This prevents swarf and other debris from entering any gap between the components of the aircraft assembly 50, as well as preventing any inter-laminar burring from forming between the components.

The second arm 73 can then be moved away from the first arm 72 to unclamp the aircraft assembly 50. The automated clamp 70 can then move to a new assembly position, either using the existing datum or by identifying a new datum using the calibration procedure.

Maintaining the clamping force during the assembly process helps to prevent the presence of swarf, debris and burring from between the components, however these manufacturing bi-products are still produced and this increases the chances of contamination. Moreover, the swarf and debris may still fall and rest within the wing box.

Figure 18:
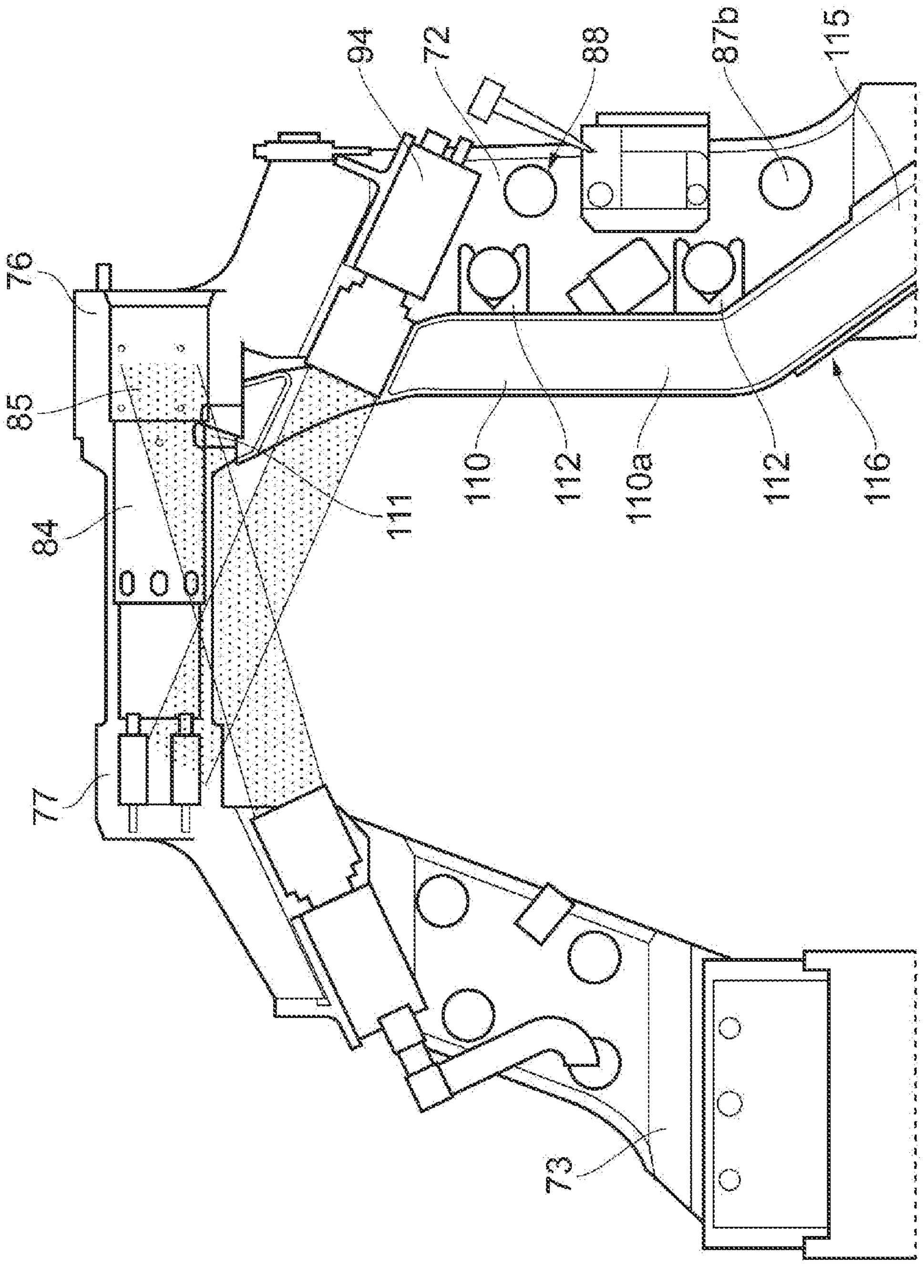
FIG. 18 shows a cross-sectional view of the clamp jaws.

To address these issues, a swarf channel 110 is provided that extends into the tool module docking aperture 84 (See FIG. 18). The swarf channel 110 is fluidically connected to a vacuum source such that a vacuum pressure is applied to extract waste material from inside the tool module docking aperture 84 and adjacent the aircraft assembly.

The swarf channel 110 enters into the tool module docking aperture 84 at a position between the collet bore 85 and the end of the first jaw 72 arranged to contact the surface of the clamped aircraft assembly 50. In particular, the inlet 111 is located at the bearing surface between the jaw body 101 and the nose-piece 102 so that a portion of the inlet 111 is formed in the jaw body 101 and a portion of the inlet 111 is formed in the nose-piece 102.

Figure 9:
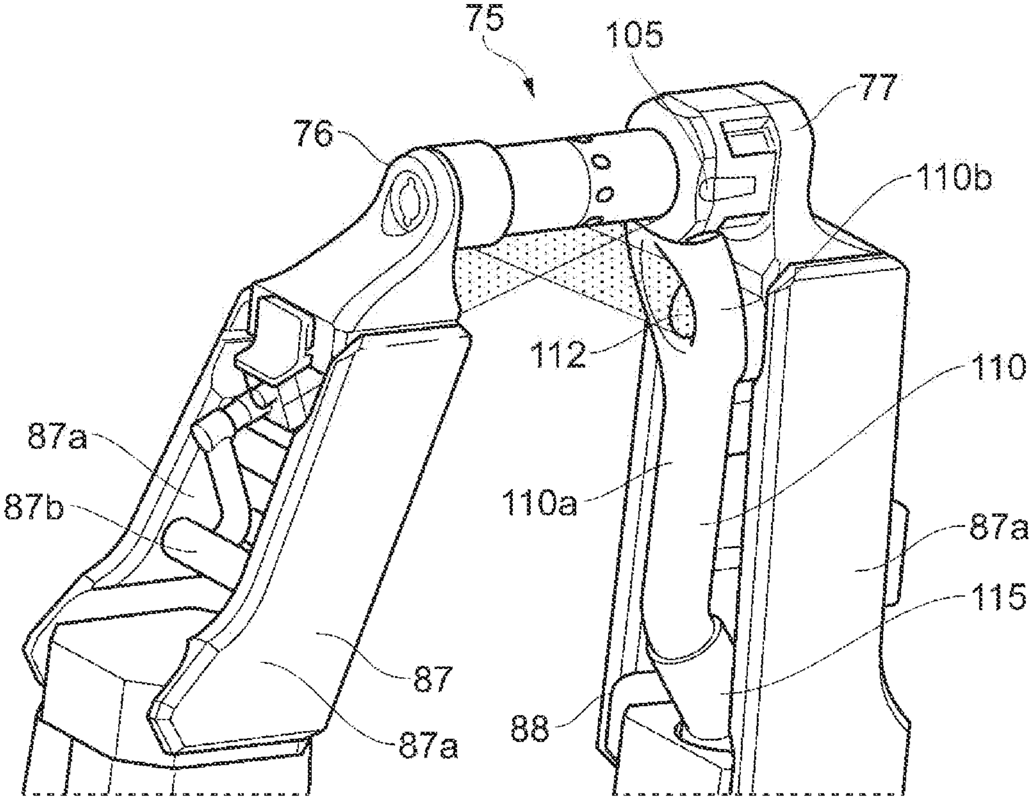
FIG. 9 shows a second view of the clamp jaws.

The swarf channel 110 extends from the inlet 111 and down the first arm 72 towards the base 74 of the clamp frame 71. The swarf channel 110 is located on an inner facing side of the first arm 72 facing the second arm 73. The swarf channel is releasably attached to the first arm 72 by clips 112. The clamp frame 71 is modular, with the clamp jaws 76, 77, imaging devise 94, and the swarf channel 110 each attached to mounting formation 87 of the respective arm 72, 73 (See FIG. 9). Each mounting formation 87 includes opposing plates 87*a* separated by spacers 87*b* that define a housing 88 of the arm 72, 73. The swarf channel 110 is located at least partially in the housing 88 of the first arm 72.

The swarf channel 110 is connected to a flexible vacuum hose 115. The flexible vacuum hose 115 extends partly up the first arm 72 and connects to the swarf at a vacuum coupling 116.

In order to avoid disrupting the line of sight of the imagine device 94 of the first arm 72, the swarf channel 110 deviates from a direct, linear path from the flexible vacuum hose 115 (specifically the vacuum coupling 116) to the inlet 111 so as to curve around the line of sight of the imaging device 94.

In the example shown, the swarf channel 110 includes a main channel 110*a* and two sub-channels 110*b*. The sub-channels 110*b* are arranged in parallel and extend either side of the line of sight of the imaging device 94. The sub-channels 110*b* both converge to the main channel 110*a* at either end so as to define an aperture 112 through which the line of sight extends (as shown best in FIG. 9). The sub-channels 110*b* each have a cross-sectional area approximately half of that of the main channel 110*a*, such that the overall cross-section of the swarf channel 110 is approximately constant along the fluidic path to the aperture 84.

To produce this complex shape, the swarf channel 110 may be formed by additive manufacturing (3D printing). The swarf channel 110 may be formed of plastic. The swarf channel 110 may be substantially rigid relative to the flexible vacuum hose 115.

The vacuum pressure is typically supplied through the swarf channel 110 during throughout the entire assembly process, with the vacuum supplied prior to drilling commences and maintained until the components have been fastened together. This helps to extract swarf and other debris from the tool module docking aperture 84.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An automated clamp for clamping a rib web to a rib post or rib foot of an aircraft wing box, the clamp comprising:

a clamp frame having a first arm and a second arm extending from the base of the clamp frame, wherein the second arm is moveable towards and away from the first arm;

a robot end effector connector coupled to the clamp frame;

clamp jaws including a first jaw fixed at a distal end of the first arm, and a second jaw fixed at a distal end of the second arm, the clamp jaws configured to clamp a rib web to a rib post or clamp a rib web to a rib foot;

wherein the first jaw and/or second jaw comprises a contact normalization system, the contact normalization system comprising:

a jaw body fixed relative to the respective arm, and a nose-piece rotatably coupled to the jaw body at a bearing surface, the nose-piece configured to contact a surface of one of the rib web, rib post and rib foot, wherein the rotatable coupling of the nose-piece is configured to passively rotate the nose-piece relative to the jaw body upon contact with the surface.

2. The automated clamp of claim 1, wherein the bearing surface is formed between a spherical end surface of the jaw body and a spherical end surface of the nose-piece.

3. The automated clamp of claim 2, wherein the nose-piece comprises a planar end surface surrounded circumferentially by the spherical end surface of the nose-piece.

4. The automated clamp of claim 1, wherein the nose-piece is rotatable about two axes perpendicular to a longitudinal axis of the jaw body.

5. The automated clamp of claim 1, wherein the clamp jaws comprise two or more flexible elements configured to bias the nose-piece towards the jaw body.

6. The automated clamp of claim 1, wherein the contact normalization system comprises a processing unit and one or more contact sensors configured to send a signal to the processing unit indicative of an angular rotation of the nose-piece relative to the jaw body.

7. The automated clamp of claim 6, wherein the contact sensors are fixed to the jaw body, the contact sensors arranged to contact the nose-piece and send a signal to the processing unit indicative of an angular rotation of the nose-piece relative to the jaw body.

8. The automated clamp of claim 6, wherein the one or more contact sensors are each housed within the jaw body.

9. The automated clamp of claim 1, wherein the contact normalization system comprises two or more of the contact sensors fixed to the jaw body, and preferably three or more contact sensors.

10. The automated clamp of claim 1, comprising a vision system, the vision system having one or more imaging devices for detecting a datum of the rib web, rib post, or rib foot.

11. The automated clamp of claim 10, wherein the vision system includes a first imaging device fixed to the first arm and having a line of sight oriented at an acute angle to a longitudinal axis of the clamp jaws and/or the vision system has a second imaging device fixed to the second arm and having a line of sight oriented at an acute angle to a longitudinal axis of the clamp jaws.

12. The automated clamp of claim 1, wherein the first and/or second jaw has a tool module docking aperture for receiving a tool module, the tool module docking aperture arranged to provide access to the rib web and rib post or rib foot clamped between the clamp jaws.

13. A method of automatically clamping components of an aircraft assembly together using the automated clamp of claim 1, the method comprising:

positioning the nose-piece into contact with a surface of the aircraft assembly such that the nose-piece rotates until a longitudinal axis of the nose-piece aligns with a normal vector of the surface; and rotating the jaw body relative to the nose-piece to align a longitudinal axis of the jaw body to the longitudinal axis of the nose-piece and the normal vector of the surface.

14. The method of claim 13, wherein the contact normalization system comprises a processing unit, and the method further comprising:

sending a signal to the processing unit indicative of an angular rotation of the nose-piece relative to the jaw body to determine an angle of rotation; and rotating the jaw body relative to the nose-piece in accordance with the determined angle of rotation.

15. The method of claim 13, wherein the automated clamp further comprises a vision system, and the method further comprising:

moving the first jaw a predetermined distance away from the aircraft assembly;

calibrating the vision system relative to the aircraft assembly based on the predetermined distance; and identifying a datum on the aircraft assembly with the vision system.

16. The method of claim 13, comprising:

moving the second arm towards the first arm to clamp the aircraft assembly between the clamp jaws.

17. The method of claim 16, wherein the first and/or second jaw has a tool module docking aperture, and the method further comprising:

inserting a drilling tool module into the tool module docking aperture and drilling a hole through the clamped aircraft assembly;

removing the drilling tool module from the tool module docking aperture;

inserting a fastening tool module into the tool module docking aperture to fasten the aircraft assembly; and moving the second arm away from the first arm to unclamp the aircraft assembly.

18. The method of claim 13, wherein the aircraft assembly comprises a rib web and a rib post of an aircraft wing box or a rib web and a rib foot of an aircraft wing box.

19. An automated clamp for clamping a rib web to a rib post or rib foot of an aircraft wing box, the clamp comprising:

a clamp frame having a first arm and a second arm extending from the base of the clamp frame, wherein the second arm is moveable towards and away from the first arm;

a robot end effector connector coupled to the clamp frame;

clamp jaws including a first jaw fixed at a distal end of the first arm, and a second jaw fixed at a distal end of the second arm, the clamp jaws configured to clamp a rib web to a rib post or clamp a rib web to a rib foot;

wherein the first jaw and/or second jaw comprises a contact normalization system, the contact normalization system comprising:

a jaw body fixed relative to the respective arm, and a nose-piece rotatably coupled to the jaw body at a bearing surface, the nose-piece configured to contact a surface of one of the rib web, rib post and rib foot, wherein the rotatable coupling of the nose-piece is configured to passively rotate the nose- piece relative to the jaw body upon contact with the surface, and wherein the rotation of the nose-piece is about two axes perpendicular to a longitudinal axis of the jaw body.

* * * * *